(12) United States Patent
Kato et al.

(10) Patent No.: US 12,275,421 B2
(45) Date of Patent: Apr. 15, 2025

(54) VEHICLE CONTROL SYSTEM, VEHICLE, AND CONTROL METHOD

(71) Applicant: HONDA MOTOR CO., LTD., Tokyo (JP)

(72) Inventors: Hisahiro Kato, Tokyo (JP); Yusuke Yoshimura, Tokyo (JP); Tomoya Tokunaga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 313 days.

(21) Appl. No.: 17/671,615

(22) Filed: Feb. 15, 2022

(65) Prior Publication Data

US 2022/0315025 A1    Oct. 6, 2022

(30) Foreign Application Priority Data

Mar. 30, 2021    (JP) .................... 2021-058217

(51) Int. Cl.
*B60W 50/10*    (2012.01)
*B60W 40/09*    (2012.01)
*H04L 12/40*    (2006.01)

(52) U.S. Cl.
CPC ............ *B60W 50/10* (2013.01); *B60W 40/09* (2013.01); *H04L 12/40* (2013.01); *H04L 2012/40273* (2013.01)

(58) Field of Classification Search
CPC .. B60W 50/10; B60W 40/09; B60W 50/0098; B60W 2050/0006;

(Continued)

(56) References Cited

U.S. PATENT DOCUMENTS 5,557,754 A * 9/1996 Sone ...................... G06F 13/36
                                                                710/309
5,619,661 A * 4/1997 Crews ................... G06F 13/362
                                                                710/309

(Continued)

FOREIGN PATENT DOCUMENTS

CN          204488735 U       7/2015
CN          110562122 A       12/2019

(Continued)

OTHER PUBLICATIONS

Translation of JP-2020077233-A retrieved from Espacenet on Feb. 22, 2024 (Year: 2024).*

(Continued)

*Primary Examiner* — Thomas Ingram
*Assistant Examiner* — Faris Asim Shaikh

(57) ABSTRACT

A vehicle control system includes a plurality of slave ECUs, and a core ECU including a gateway function for relaying data communication among the plurality of slave ECUs and between the plurality of slave ECUs and an external apparatus. The vehicle control system accepts operation requests from a plurality of systems that makes a request for an operation to an operating unit equipped in a vehicle and performing an operation based on an operation request. The operation requests from the plurality of systems include at least a request from the external apparatus or a request from a function added to the core ECU by the external apparatus. When operation requests from the plurality of systems are accepted, the core ECU performs arbitration for the operation requests from the plurality of systems and transmits an arbitration result to at least one of the plurality of slave ECUs.

11 Claims, 4 Drawing Sheets

(58) Field of Classification Search
CPC ......... B60W 2050/0091; B60W 10/20; B60W 10/18; B60W 10/04; B60W 50/06; B60W 2710/20; B60W 2710/18; B60W 2720/10; B60W 2720/106; B60W 2720/103; B60W 30/143; B60W 2050/0094; B60W 60/001; B60W 50/045; H04L 12/40; H04L 2012/40273; H04L 12/4625; H04L 12/40013; B60R 16/023; B60R 16/02; G06F 13/1605

See application file for complete search history.

(56) References Cited

U.S. PATENT DOCUMENTS

| | | | | |
|---|---|---|---|---|
| 5,835,765 | A * | 11/1998 | Matsumoto | G06F 9/4843 718/107 |
| 7,739,013 | B2 * | 6/2010 | Ishio | B60W 50/00 701/87 |
| 8,019,981 | B1 * | 9/2011 | Metzgen | G06F 9/325 712/241 |
| 11,900,092 | B2 * | 2/2024 | Sakurai | G07C 5/0808 |
| 2005/0278093 | A1 | 12/2005 | Kameyama | |
| 2007/0129815 | A1 * | 6/2007 | Flemisch | G05B 7/02 700/11 |
| 2011/0138092 | A1 * | 6/2011 | Morimoto | G06F 13/362 710/244 |
| 2013/0204493 | A1 * | 8/2013 | Ricci | G06F 11/2038 701/1 |
| 2014/0297109 | A1 * | 10/2014 | Shimomura | H04L 67/125 701/36 |
| 2015/0248742 | A1 * | 9/2015 | Yamamoto | G09G 5/18 345/522 |
| 2015/0281022 | A1 | 10/2015 | Yuzo | |
| 2017/0192917 | A1 * | 7/2017 | Yates | G06F 13/4282 |
| 2017/0199834 | A1 * | 7/2017 | Joyce | G06F 13/4282 |
| 2018/0018895 | A1 * | 1/2018 | Chan | B60W 60/001 |
| 2018/0118194 | A1 * | 5/2018 | Kuang | B60W 10/08 |
| 2018/0131538 | A1 * | 5/2018 | Ando | H04L 12/40163 |
| 2018/0217953 | A1 * | 8/2018 | Cross | G06F 13/364 |
| 2018/0295011 | A1 * | 10/2018 | Wang | H04L 41/0833 |
| 2018/0319397 | A1 * | 11/2018 | Ohta | B60W 10/04 |
| 2018/0352010 | A1 * | 12/2018 | Sakaguchi | H04L 65/1069 |
| 2019/0147855 | A1 * | 5/2019 | Zhao | G10L 15/01 704/232 |
| 2019/0173862 | A1 * | 6/2019 | Kim | H04L 9/083 |
| 2019/0258251 | A1 * | 8/2019 | Ditty | G06V 20/58 |
| 2019/0280893 | A1 * | 9/2019 | Ninagawa | G06F 8/61 |
| 2019/0344663 | A1 * | 11/2019 | Ricci | G06F 3/04817 |
| 2019/0379683 | A1 * | 12/2019 | Overby | H04W 12/122 |
| 2020/0070802 | A1 * | 3/2020 | Yamada | B60W 30/02 |
| 2020/0128082 | A1 * | 4/2020 | Azuma | H04L 67/61 |
| 2021/0218756 | A1 * | 7/2021 | Gutierrez | H04L 12/40143 |
| 2021/0234767 | A1 * | 7/2021 | Ricci | B60R 7/04 |
| 2022/0017062 | A1 * | 1/2022 | Yamada | B60W 30/02 |
| 2022/0080935 | A1 * | 3/2022 | Terada | B60T 13/662 |
| 2022/0179644 | A1 * | 6/2022 | Harata | G06F 8/65 |
| 2022/0215702 | A1 * | 7/2022 | Langard | G06F 11/0781 |
| 2022/0219702 | A1 * | 7/2022 | Itoh | B60W 30/143 |
| 2022/0274587 | A1 * | 9/2022 | Ohashi | B60W 50/0098 |
| 2024/0267430 | A1 * | 8/2024 | Azuma | H04L 67/125 |

FOREIGN PATENT DOCUMENTS

| | | | | |
|---|---|---|---|---|
| JP | 2005352732 | A | | 12/2005 |
| JP | 2014017588 | A | | 1/2014 |
| JP | 2014078800 | A | | 5/2014 |
| JP | 2014193654 | A | | 10/2014 |
| JP | 2018078396 | A | | 5/2018 |
| JP | 2019159661 | A | | 9/2019 |
| JP | 2020032892 | A | | 3/2020 |
| JP | 2020064489 | A | | 4/2020 |
| JP | 2020077233 | A | * 5/2020 | ........ B60W 50/0098 |

OTHER PUBLICATIONS

Office Action issued for counterpart Japanese Application No. 2021-058217, transmitted from the Japanese Patent Office on Jun. 11, 2024 (drafted on Jun. 4, 2024).

Office Action issued for counterpart Chinese Application 202210077806.5, issued by The State Intellectual Property Office of People's Republic of China on Mar. 7, 2025.

\* cited by examiner

VEHICLE CONTROL SYSTEM, VEHICLE, AND CONTROL METHOD

The contents of the following Japanese patent application(s) are incorporated herein by reference: NO. 2021-058217 filed in JP on Mar. 30, 2021.

BACKGROUND

1. Technical Field

The present invention relates to a vehicle control system, a vehicle, and a control method.

2. Related Art

Patent document 1 describes a vehicle control apparatus capable of adding new functions to a vehicle and removing existing functions from the vehicle. Patent document 2 describes a vehicle-mounted relay apparatus that serves as a relay between a plurality of in-vehicle networks.
Patent Document 1: Japanese Patent Application Publication No. 2019-159661
Patent Document 2: Japanese Patent Application Publication No. 2014-193654

DESCRIPTION OF EXEMPLARY EMBODIMENTS

The following describes the present invention by referring to embodiments of the invention. However, the embodiments described hereinafter do not limit the invention as in the claims. Not all of the combinations of features described in the embodiments are necessarily essential for the solution of the invention.

Figure 1:
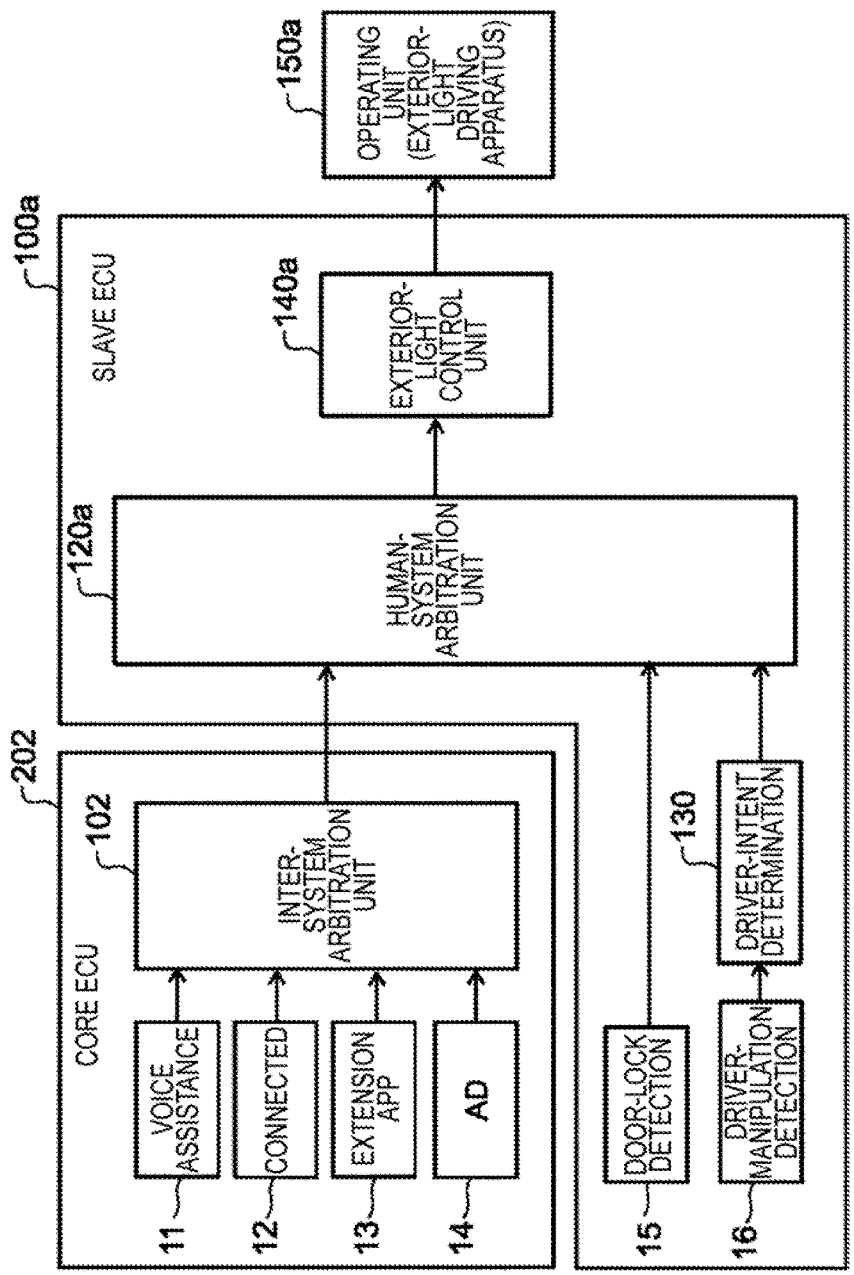
FIG. 1 schematically shows the configurations of a core ECU 202, a slave ECU 100a, and an operating unit 150a that are provided in a vehicle control apparatus according to an embodiment.

FIG. 1 schematically shows the configurations of a core ECU 202, a slave ECU 100a, and an operating unit 150a that are provided in a vehicle control apparatus according to an embodiment. FIG. 1 is intended to schematically illustrate control for operating the operating unit 150a. For example, the operating unit 150a may be a driving apparatus for an exterior light.

The core ECU 202 includes a voice assistance function 11, a connected function 12, an extension app function 13, an AD function 14, and an inter-system arbitration unit 102. The slave ECU 100a includes a human-system arbitration unit 120a, an exterior-light control unit 140a, a door-lock detection function 15, and a driver-manipulation detection function 16.

The voice assistance function 11, the connected function 12, the extension app function 13, and the AD function 14 that are provided in the core ECU 202 are functional blocks for obtaining operation requests to the operating unit 150a transmitted from various systems. The voice assistance function 11 obtains an operation request made by voice and outputs the same to the inter-system arbitration unit 102. The connected function 12 receives an operation request to the operating unit 150a from an external apparatus via a communication network such as the Internet, and outputs the same to the inter-system arbitration unit 102. The extension app function 13, which is implemented by software for extending the functions of the core ECU 202, is a function added by the external apparatus. The extension app function 13 generates, within the core ECU 202, an operation request to the operating unit 150a and outputs the same to the inter-system arbitration unit 102. The AD function 14 is a functional block pertaining to automatic driving. The AD function 14 obtains an operation request to the operating unit 150a based, for example, on output of various sensors and of an automatic driving system having an AD function, and outputs the same to the inter-system arbitration unit 102. The operation requests to the operating unit 150a include, for example, a request to turn on the exterior light, a request to turn off the exterior light, and a request to change a lighting mode of the exterior light.

The inter-system arbitration unit 102 performs arbitration for operation requests to the operating unit 150a obtained from the voice assistance function 11, the connected function 12, the extension app function 13, and the AD function 14, so as to determine how to operate the operating unit 150a. Then, the inter-system arbitration unit 102 generates a control signal to request the operating unit 150a for the determined operation, and outputs the control signal to the human-system arbitration unit 120a.

In the slave ECU 100a, a control signal indicating the state of the door-lock detection function 15 is output to the human-system arbitration unit 120a. The driver-manipulation detection function 16 is a functional block for obtaining a manipulation performed by a driver on a turn switch for the exterior light and outputting manipulation information to a driver-intent determination function 130. The driver-intent determination function 130 determines a driver's intent pertaining to an operation of the operating unit 150a and outputs, to the human-system arbitration unit 120a, a control signal for making a request for a determined operation.

The human-system arbitration unit 120a performs arbitration for a control signal from the inter-system arbitration unit 102, a control signal from the door-lock detection function 15, and a control signal obtained from the driver-intent determination function 130, so as to determine how to operate the operating unit 150a. Then, the human-system arbitration unit 120a generates a control signal for making a request to the operating unit 150a for the determined operation, and outputs the same to the exterior-light control unit 140a. Based on the input control signal, the exterior-light control unit 140a outputs a drive signal for operating the operating unit 150a to the operating unit 150a.

As described above, the inter-system arbitration unit 102 performs arbitration for operation requests from the voice assistance function 11, the connected function 12, the extension app function 13, and the AD function 14. Hence, when a service for allowing the external apparatus to operate the operating unit 150a is added as a new function to be provided by the core ECU 202, an operation request based on the new service may be added to the inter-system arbitration unit 102, and the inter-system arbitration unit 102 can perform arbitration among a plurality of systems. This eliminates the need for adding an external interface to the core ECU 202 and for changing the interface between the inter-system arbitration unit 102 and the human-system arbitration unit 120a.

The human-system arbitration unit 120a performs arbitration for an arbitration result of arbitration among systems performed by the human-system arbitration unit 120a and an operation request made by a manipulation performed by a human such as a driver, thereby generating a control signal to be output to the exterior-light control unit 140a. This eliminates the need for changing the interface between the human-system arbitration unit 120a and the exterior-light control unit 140a when adding a new service. As described above, a configuration is provided for allowing the inter-system arbitration unit 102 to perform arbitration for operation requests from systems and allowing the human-system arbitration unit 120a to perform arbitration for operation requests from a human and a system. This configuration reduces the number of system changes, such as introduction of new interface, that are required when adding a new service to the core ECU 202. Hence, the number of development man-hours required to construct a control logic for performing arbitration for an operation request based, for example, on a switch manipulation performed by a human and an operation request from an existing system can be decreased.

Figure 2:
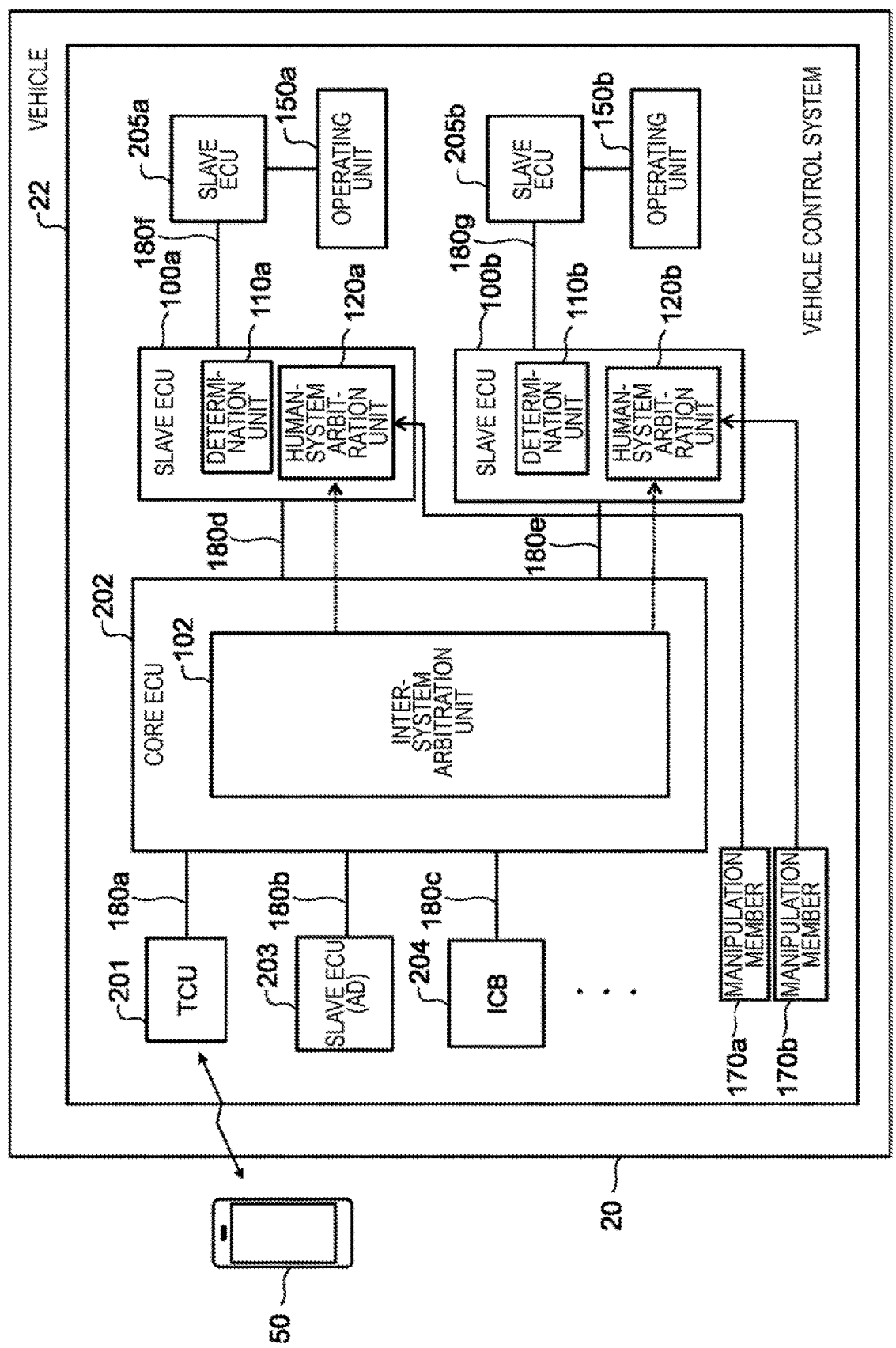
FIG. 2 shows the overall functional configuration provided in a vehicle 20 according to an embodiment.

FIG. 2 shows the overall functional configuration provided in a vehicle 20 according to an embodiment. The vehicle 20 includes a vehicle control system 22. The vehicle control system 22 includes a TCU 201, the core ECU 202, a slave ECU 203, an ICB 204, the slave ECU 100a, a slave ECU 100b, a slave ECU 205a, a slave ECU 205b, a manipulation member 170a, and a manipulation member 170b. In the configuration shown in FIG. 2, the vehicle 20 includes the vehicle control system 22. However, the configuration of the vehicle 20 is not limited to examples of the present embodiment and may include other components. Likewise, the configuration of the vehicle control system 22 is not limited to examples of the present embodiment and may include other components. Note that not all the components are shown in FIG. 2.

The core ECU 202, the slave ECU 203, the ICB 204, the slave ECU 100a, the slave ECU 100b, the slave ECU 205a, and the slave ECU 205b are electronic control units for controlling vehicle-mounted devices. The core ECU 202, the ICB 204, the slave ECU 100a, the slave ECU 100b, the slave ECU 205a, and the slave ECU 205b may each include a computer provided with a processor, a volatile memory, and a nonvolatile memory. The TCU 201 is a telematics control unit.

The TCU 201 is responsible for wireless communication with an element external to the vehicle 20. For example, the TCU 201 is responsible for wireless LAN communication and for wireless communication via a moving body network. A communication terminal 50, which is an example of the external apparatus, can communicate with the core ECU 202 via the TCU 201. For example, the user of the communication terminal 50 can communicate with the core ECU 202 by using the communication terminal 50 so as to remotely manipulate a power window of the vehicle 20.

The core ECU 202 is connected to the TCU 201 via an in-vehicle network 180a. The core ECU 202 and the TCU 201 can communicate with each other via the in-vehicle network 180a. The core ECU 202 is connected to the slave ECU 203 via an in-vehicle network 180b. The core ECU 202 and the slave ECU 203 can communicate with each other via the in-vehicle network 180b. For example, the slave ECU 203 may be an ECU pertaining to an automatic driving system. The core ECU 202 is connected to the ICB 204 via an in-vehicle network 180c. The core ECU 202 and the ICB 204 can communicate with each other via the in-vehicle network 180c. The ICB 204 is an infotainment control box (ICB) equipped with a voice assistance function and/or an extension app. The ICB 204 may include a user interface such as a display. The ICB 204 is an example of a slave ECU. The ICB 204 may generate an operation request to the operating unit 150. The core ECU 202 is connected to the slave ECU 100a via an in-vehicle network 180d. The core ECU 202 and the slave ECU 100a can communicate with each other via the in-vehicle network 180d. The core ECU 202 is connected to the slave ECU 100b via an in-vehicle network 180e. The core ECU 202 and the slave ECU 100b can communicate with each other via the in-vehicle network 180e. The slave ECU 100a is connected to the slave ECU 205a via an in-vehicle network 180f. The slave ECU 100a and the slave ECU 205a can communicate with each other via the in-vehicle network 180f. The slave ECU 100b is connected to the slave ECU 205b via an in-vehicle network 180g. The slave ECU 100b and the slave ECU 205b can communicate with each other via the in-vehicle network 180g.

For example, the in-vehicle network 180a is a communication network compliant with Ethernet (registered trademark). The in-vehicle networks 180b, 180c, 180d, 180e, 180f, and 180g are, for example, controller area network (CAN) communication networks.

Now, specific descriptions will be given using the example shown in FIG. 2. The core ECU 202 includes the inter-system arbitration unit 102. The slave ECU 100a includes a determination unit 110a and the human-system arbitration unit 120a. The slave ECU 100b includes a determination unit 110b and a human-system arbitration unit 120b. Output of the manipulation member 170a is input to the human-system arbitration unit 120a. Output of the manipulation member 170b is input to the human-system arbitration unit 120b.

The operating unit 150a and an operating unit 150b perform operations based on an operation request. The operating unit 150a is, for example, a driving apparatus at the exterior light. The operating unit 150b is a driving apparatus for a power window. The manipulation member 170a is, for example, a turn switch for the exterior light. The manipulation member 170a is, for example, a manipulation switch for the power window. With respect to the present embodiment, the driving apparatuses for the exterior light and the power window are exemplified as operating units. However, the operating units may be driving apparatuses for a lighting body such as the exterior light and for a window such as a power window, as well as driving apparatuses for open-close bodies for, for example, a sunroof, a tailgate, and doors, and driving apparatuses for various vehicle-mounted devices such as wipers, door locks, an air conditioner, and a horn. Note that the operating units are not limited to body-related driving apparatuses and may be traveling-related driving apparatuses.

The slave ECU 203, the ICB 204, the slave ECU 100a, and the slave ECU 100b are connected via the in-vehicle network 180a. The core ECU 202 includes a gateway function for relaying data communication between the slave ECU 203, the ICB 204, the slave ECU 100a, the slave ECU 100b, the slave ECU 205a, and the slave ECU 205b, and data communication between the communication terminal 50 and each of the ICB 204, the slave ECU 100a, and the slave ECU 100b. The core ECU 202 may be referred to a "central ECU", a "master ECU" or the like.

The core ECU 202 accepts operation requests from a plurality of systems that make a request to the operating unit 150 for an operation. For example, an operation request may be accepted by means of the voice assistance function 11, connected function 12, extension app function 13, and/or AD function shown in FIG. 1, which are respectively equipped in the ICB 204, the TCU 201, the ICB 204, and the slave ECU 203. For example, an operation request to the operating unit 150 may be transmitted from the external communication terminal 50, and the core ECU 202 may accept the transmitted operation request via the TCU 201. The core ECU 202 may accept an operation request to the operating unit 150 transmitted from the slave ECU 203. An operation request to the operating unit 150 may be generated within the core ECU 202 based on information detected by the ICB 204. Operation requests include at least a request from the communication terminal 50 or a request from a function added to the core ECU 202 by the communication terminal 50.

When operation requests from a plurality of systems are accepted, the core ECU 202 performs arbitration for the operation requests from the plurality of systems and transmits an arbitration result to at least one of the slave ECUs 100a and 100b. Specifically, the inter-system arbitration unit 102 of the core ECU 202 performs arbitration for the operation requests from the plurality of systems.

Accordingly, the core ECU 202 receives operation requests pertaining to the body of the vehicle 20 and performs arbitration for the received operation requests. Hence, by simply changing the arbitration logic of the core ECU 202, which includes the gateway function between the external apparatus and vehicle-internal apparatuses, a new service or function can be added without affecting the other interfaces. Thus, the number of development man-hours when adding a new service or function can be decreased. The functions of the core ECU 202 can be updated over the air (OTA), so the number of development man-hours required to add a new service or function can be decreased.

At least one of the core ECU 202, the slave ECU 203, the ICB 204, the slave ECU 100a, and the slave ECU 100b obtains input information of an operation instruction for the operating unit 150 from a human, and performs arbitration for the operation instruction from the human and an arbitration result provided by the core ECU 202 for operation requests from a plurality of systems. In the configuration in FIG. 2, at least one of the slave ECUs 100a and 100b obtains an operation instruction from a human, and performs arbitration for the operation instruction from the human and an arbitration result provided by the core ECU 202 for operation requests from a plurality of systems. For example, the human-system arbitration unit 120a may perform arbitration for an arbitration result provided by the core ECU 202 and an operation instruction from a human input via the manipulation member 170a. The human-system arbitration unit 120b may perform arbitration for an arbitration result provided by the core ECU 202 and an operation instruction from a human input via the manipulation member 170b. The slave ECU 100a transmits a control signal corresponding to an arbitration result to the slave ECU 205a so as to cause the slave ECU 205a to operate the operating unit 150a. The slave ECU 100b transmits a control signal based on an arbitration result to the slave ECU 205b so as to cause the slave ECU 205b to operate the operating unit 150b. In this way, since the core ECU 202 does not need to perform arbitration for input information from a human, the performance of response to a manipulation performed by the human can be enhanced. Moreover, the number of development man-hours pertaining to arbitration can be decreased.

The determination units 110a and 110b determine which of operation requests from a plurality of systems or an operation instruction from a human is to be prioritized. At least one of the slave ECUs 100a and 100b includes a determination unit that determines which of operation requests from a plurality of systems or an operation instruction from a human is to be prioritized. Providing the slave ECUs 100a and 100b with the determination units 110a and 110b allows arbitration to be performed without changing an interface on a stage subsequent to the core ECU 202. Furthermore, the performance of response to a manipulation performed by a human can be enhanced.

Determinations made by the determination units 110a and 110b may be changeable through program rewriting for at least one of the slave ECUs 100a and 100b. Thus, through program rewriting performed in, for example, an OTA manner, switching can be performed as to which of operation requests from a plurality of systems or an operation instruction from a human is to be prioritized. Accordingly, for example, when adapting a vehicle un-adapted to high-mode automatic driving to a high automatic driving mode, human-prioritized control needs to be switched to system-prioritized control. This switching can be performed through program rewriting.

The core ECU 202 may transmit, to at least one of the slave ECUs 100a and 100b, an arbitration result provided by the core ECU 202 for operation requests from a plurality of systems, as well as information indicating which of the operation requests from the plurality of systems or an operation instruction from a human is to be prioritized. Thus, when the slave ECU 100 does not accommodate program rewriting, program rewriting may be performed for the core ECU 202 so as to perform switching as to which of operation requests from a plurality of systems or an operation instruction from a human is to be prioritized.

Figure 3:
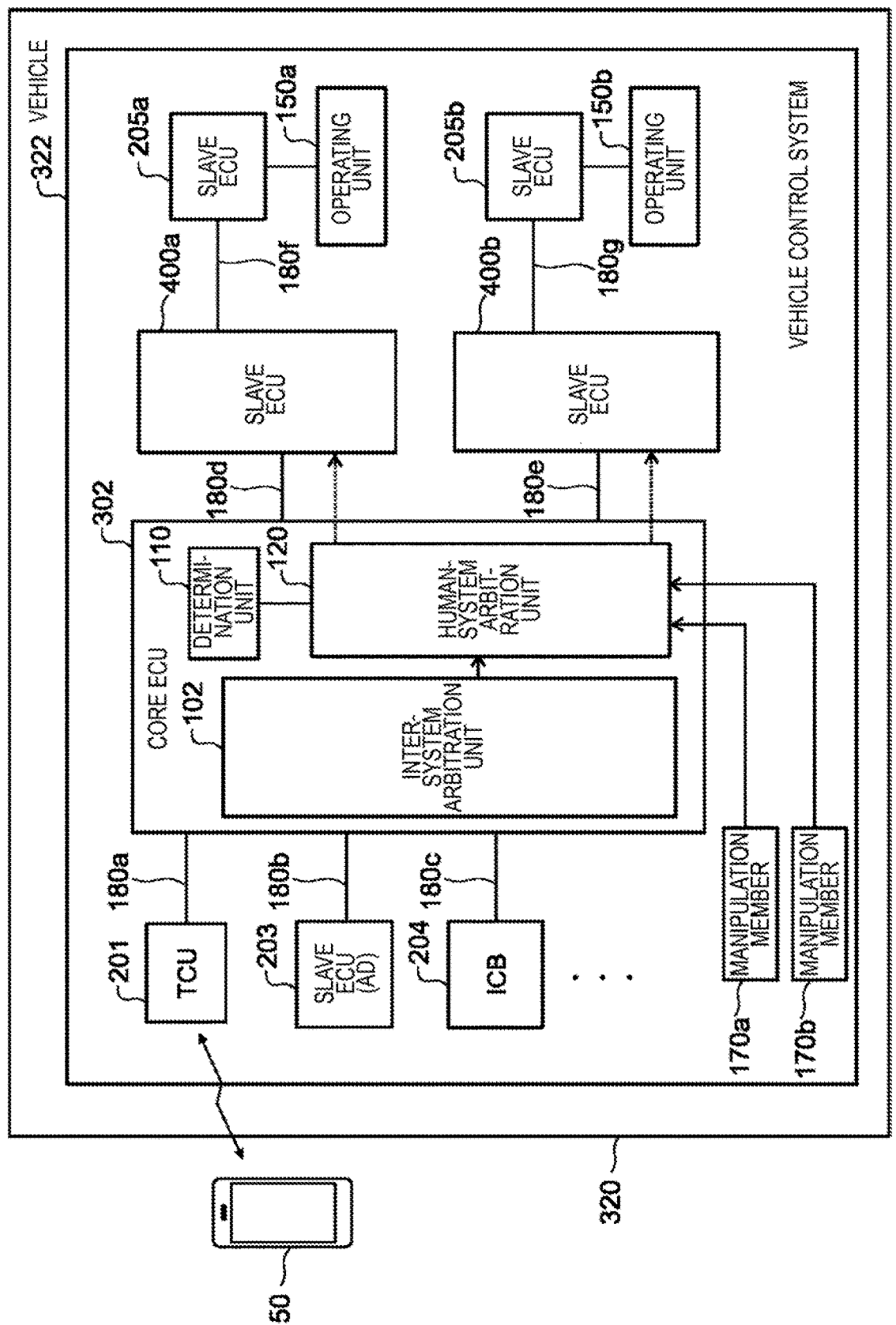
FIG. 3 shows the overall functional configuration provided in a vehicle 320 that is a variation of the vehicle 20.

FIG. 3 shows the overall functional configuration provided in a vehicle 320 that is a variation of the vehicle 20. The vehicle 320 includes a vehicle control system 322 as a variation of the vehicle control system 22. The vehicle control system 322 includes the TCU 201, a core ECU 302, the slave ECU 203, the ICB 204, a slave ECU 400a, a slave ECU 400b, the manipulation member 170a, and the manipulation member 170b. The following mainly describes differences between the vehicle control system 322 and the vehicle control system 22 shown in FIG. 2.

In the vehicle control system 322, the core ECU 302 includes a human-system arbitration unit 120 and a determination unit 110 in addition to the inter-system arbitration unit 102. The slave ECU 400a does not include functions corresponding to the determination unit 110a and the human-system arbitration unit 120a. The slave ECU 400b does not include functions corresponding to the determination unit 110b and the human-system arbitration unit 120b. Outputs of the manipulation members 170a and 170b are input to the human-system arbitration unit 120. The slave ECU 400a operates the operating unit 150a via the slave ECU 205a. The slave ECU 400b operates the operating unit 150b via the slave ECU 205b.

In the vehicle control system 322, the core ECU 302 performs arbitration for an operation instruction from a human and an arbitration result of arbitration for operation requests from systems, unlike in the vehicle control system 22. Specifically, the core ECU 302 obtains input instruction information of an operation instruction from a human, performs arbitration for the operation instruction from the human and operation requests from a plurality of systems, and transmits an arbitration result to at least one of the slave ECUs 400a and 400b.

More specifically, the human-system arbitration unit 120 obtains an arbitration result of arbitration for operation requests from a plurality of systems from the inter-system arbitration unit 102. The human-system arbitration unit 120 obtains, via the manipulation members 170a and 170b, input instruction information of an operation instruction from a human. Then, the human-system arbitration unit 120 performs arbitration for the operation instruction from the human and the operation requests from the plurality of systems and transmits an arbitration result to at least one of the slave ECUs 400a and 400b. The determination unit 110 determines which of the operation requests from the plurality of systems or the operation instruction from the human is to be prioritized.

In the vehicle control system 322, the core ECU 302 performs arbitration for operation requests from a plurality of systems and performs arbitration for an arbitration result and an operation instruction from a human, as in the vehicle control system 22. Accordingly, as in the case of the vehicle control system 22, since the core ECU 302 performs arbitration processing for operation requests from a plurality of systems, the interface for the arbitration processing or an interface for the processing following the arbitration processing does not need to be changed when adding a service or a function. Hence, an automatic driving function, an extension application, or a new service can be easily added at the correct time. Moreover, the number of development man-hours can be suppressed from increasing.

The vehicle 20 is a vehicle as an example of a transport machine. The vehicle may be an automobile such as an automobile provided with an internal combustion engine, an electric automobile, or a fuel-cell vehicle (FCV). Examples of the automobile include a bus, a truck, a two-wheeled vehicle, and the like. The vehicle may be a saddled vehicle etc., or may be a bike. Examples of the transport machine include, besides a vehicle, an aircraft such as an unmanned aircraft and a machine such as a ship. The transport machine may be any machine for transporting humans or products. The transport machine is an example of a moving body. The moving body is not limited to a transport machine and may be any machine that can move.

Figure 4:
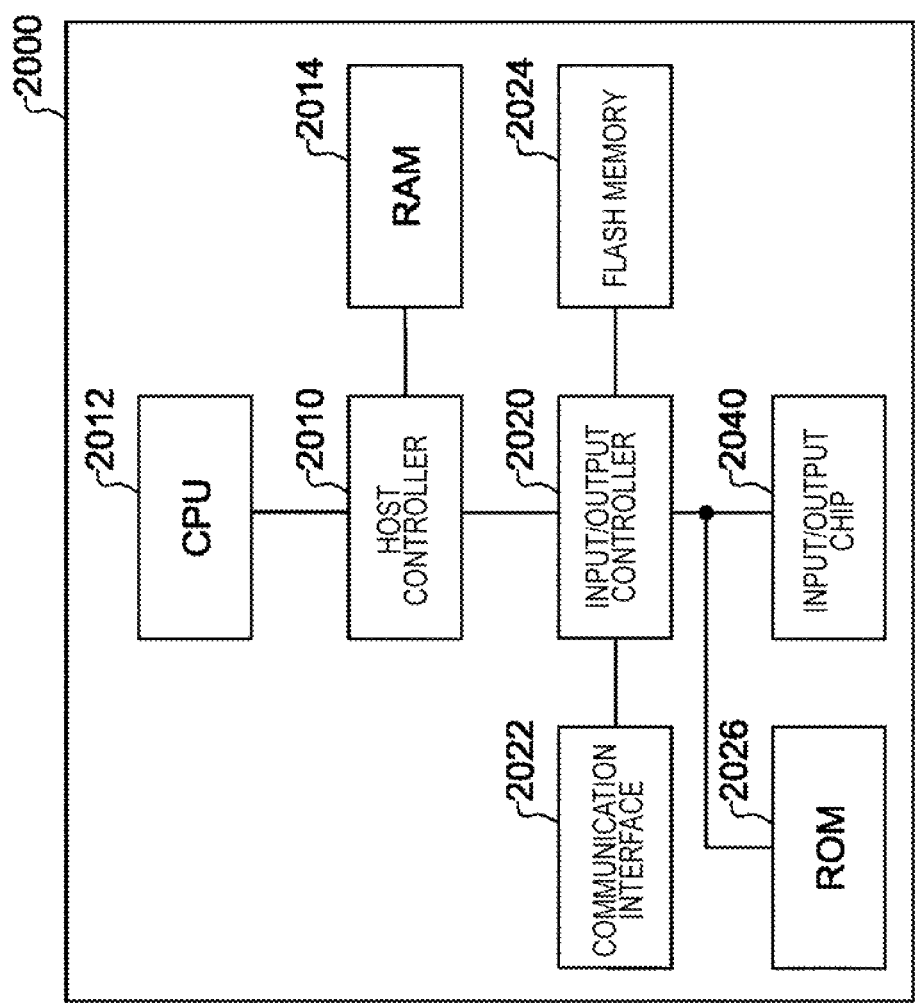
FIG. 4 shows an example of a computer 2000.

FIG. 4 shows an example of a computer 2000 that may entirely or partially implement a plurality of embodiments of the present invention. A program installed in the computer 2000 can allow the computer 2000 to: function as systems such as the vehicle control systems according to embodiments or components of the systems, or as apparatuses such as the core ECUs 202 and 302 and the slave ECUs 100a and 100b or components of the apparatuses; perform operations associated with the systems or components of the systems or with the apparatuses or components of the apparatuses; and/or perform processes according to embodiments or steps in the processes. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. Programs are installed in the flash memory 2024, the RAM 2014, or the ROM 2026 and executed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may execute a communication program loaded onto the RAM 2014 to instruct communication processing to the communication interface 2022, based on the processing described in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable storage medium on or near the computer 2000. A recording medium such as a hard disk or a RAM provided in a server system connected to a dedicated communication network or the Internet can be used as the computer-readable storage media. A program stored in the computer-readable storage medium may be provided to the computer 2000 via a network.

Programs that are installed in the computer 2000 and cause the computer 2000 to function as the core ECU 202 may contact the CPU 2012 or the like so as to cause the computer 2000 to function as each unit of the core ECU 202. The information processing described in these programs is read into the computer 2000 so as to function as each unit of the core ECU 202, which is constituted by specific means in which software and the above-mentioned various types of hardware resources cooperate with each other. By using these specific means, information computation or processing corresponding to purposes of use of the computer 2000 in the present embodiment can be realized, thereby building a particular core ECU 202 corresponding to the purposes of use.

Programs that are installed in the computer 2000 and cause the computer 2000 to function as the core ECU 302 may contact the CPU 2012 or the like so as to cause the computer 2000 to function as each unit of the core ECU 302. The information processing described in these programs is read into the computer 2000 so as to function as each unit of the core ECU 302, which is constituted by specific means in which software and the above-mentioned various types of hardware resources cooperate with each other. By using these specific means, information computation or processing corresponding to purposes of use of the computer 2000 in the present embodiment can be realized, thereby building a particular core ECU 302 corresponding to the purposes of use.

Programs that are installed in the computer 2000 and cause the computer 2000 to function as the slave ECU 100*a* may contact the CPU 2012 or the like so as to cause the computer 2000 to function as each unit of the slave ECU 100*a*. The information processing described in these programs is read into the computer 2000 so as to function as each unit of the slave ECU 100*a*, which is constituted by specific means in which software and the above-mentioned various types of hardware resources cooperate with each other. By using these specific means, information computation or processing corresponding to purposes of use of the computer 2000 in the present embodiment can be realized, thereby building a particular slave ECU 100*a* corresponding to the purposes of use.

Programs that are installed in the computer 2000 and cause the computer 2000 to function as the slave ECU 100*b* may contact the CPU 2012 or the like so as to cause the computer 2000 to function as each unit of the slave ECU 100*b*. The information processing described in these programs is read into the computer 2000 so as to function as each unit of the slave ECU 100*b*, which is constituted by specific means in which software and the above-mentioned various types of hardware resources cooperate with each other. By using these specific means, information computation or processing corresponding to purposes of use of the computer 2000 in the present embodiment can be realized, thereby building a particular slave ECU 100*b* corresponding to the purposes of use.

Various embodiments have been described by referring to the block diagrams and the like. Each block in the block diagrams may represent (1) steps of processes in which operations are performed or (2) sections of apparatuses responsible for performing operations. Certain steps and sections may be implemented by dedicated circuitry, programmable circuitry supplied with computer-readable instructions stored on computer-readable storage medium, and/or processors supplied with computer-readable instructions stored on computer-readable storage medium. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable storage medium may include any tangible device that can store instructions for execution by a suitable device, such that the computer-readable storage medium having instructions stored therein forms at least a portion of an article of manufacture including instructions which can be executed to create means for performing processing operations or operations specified in the block diagrams. Examples of computer-readable storage medium may include an electronic storage medium, a magnetic storage medium, an optical storage medium, an electromagnetic storage medium, a semiconductor storage medium, etc. More specific examples of computer-readable storage medium may include a floppy (registered trademark) disc, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing described processing operations or operations specified in the block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

11: voice assistance function
12: connected function
13: extension app function
14: AD function
15: door-lock detection function
16: driver-manipulation detection function
20: vehicle
22: vehicle control system
100: slave ECU
110: determination unit
120: human-system arbitration unit
130: driver-intent determination function
140: exterior-light control unit
150: operating unit
170: manipulation member
180: in-vehicle network
201: TCU
202: core ECU
203: slave ECU
204: ICB
205: slave ECU
320: vehicle
322: vehicle control system
302: core ECU
400: slave ECU
2000: computer
2010: host controller
2012: CPU
2014: RAM
2020: input/output controller
2022: communication interface
2024: flash memory
2026: ROM
2040: input/output chip

What is claimed is:

1. A vehicle control system comprising:
a plurality of slave ECUs, each including at least one first processor and connected via an in-vehicle network; and
a core ECU including at least one second processor configured to:
relay data communication among the plurality of slave ECUs and data communication between the plurality of slave ECUs and an external apparatus;
accept operation requests from a plurality of systems, the plurality of systems making requests to an operating unit for an operation, the operating unit being equipped in a vehicle and performing an operation based on an operation request; and
when the operation requests from the plurality of systems are accepted, perform first arbitration for the operation requests from the plurality of systems and transmit a first arbitration result to at least one slave ECU of the plurality of slave ECUs, wherein
the operation requests from the plurality of systems include at least a request from the external apparatus or a request from a function added to the core ECU by the external apparatus,
the at least one first processor of the at least one slave ECU is configured to:
obtain an operation instruction to the operating unit from a human; and
perform second arbitration for the operation instruction from the human and the first arbitration result for the operation requests from the plurality of systems, and
the at least one second processor of the core ECU is further configured to transmit, to the at least one first processor of the at least one slave ECU, the first arbitration result for the operation requests from the plurality of systems, as well as information indicating which of the operation requests from the plurality of systems or the operation instruction from the human is to be prioritized.

2. The vehicle control system according to claim 1, wherein
the at least one second processor of the core ECU obtains the operation instruction from the human, performs the second arbitration, and transmits a second arbitration result to the at least one slave ECU.

3. The vehicle control system according to claim 1, wherein
the vehicle control system is configured to determine which of the operation requests from the plurality of systems or the operation instruction from the human is to be prioritized.

4. The vehicle control system according to claim 1, wherein
the at least one first processor of the at least one slave ECU is configured to determine which of the operation requests from the plurality of systems or the operation instruction from the human is to be prioritized.

5. The vehicle control system according to claim 4, wherein
the determination is changeable through program rewriting for the at least one slave ECU.

6. The vehicle control system according to claim 1, wherein
the operating unit includes at least one of a lighting body and an open-close body.

7. The vehicle control system according to claim 2, wherein
the vehicle control system is configured to determine which of the operation requests from the plurality of systems or the operation instruction from the human is to be prioritized.

8. The vehicle control system according to claim 2, wherein
the operating unit includes at least one of a lighting body and an open-close body.

9. The vehicle control system according to claim 3, wherein
the operating unit includes at least one of a lighting body and an open-close body.

10. A vehicle comprising the vehicle control system according to claim 1.

11. A control method performed by a vehicle control system, the vehicle control system including a plurality of slave ECUs, each including at least one first processor and connected via an in-vehicle network and a core ECU including at least one second processor configured to relay data communication among the plurality of slave ECUs and data communication between the plurality of slave ECUs and an external apparatus, the at least one second processor of the core ECU being configured to accept operation requests from a plurality of systems, the plurality of systems making a request to an operating unit for an operation, the operating unit being equipped in a vehicle and performing an operation based on an operation request, wherein the operation requests from the plurality of systems include at least a request from the external apparatus or a request from a function added to the core ECU by the external apparatus, and the control method comprises:

when the operation requests from the plurality of systems are accepted, performing, by the at least one second processor of the core ECU, first arbitration for the operation requests from the plurality of systems;

transmitting, by the at least one second processor of the core ECU, a first arbitration result to at least one slave ECU of the plurality of slave ECUs;

obtaining, by the at least one first processor of the at least one slave ECU, an operation instruction to the operating unit from a human;

performing, by the at least one first processor of the at least one slave ECU, second arbitration for the operation instruction from the human and the first arbitration result for the operation requests from the plurality of systems; and transmitting, by the at least one second processor of the core ECU, to the at least one first processor of the at least one slave ECU, the first arbitration result for the operation requests from the plurality of systems, as well as information indicating which of the operation requests from the plurality of systems or the operation instruction from the human is to be prioritized.

* * * * *